Patented Jan. 4, 1927.

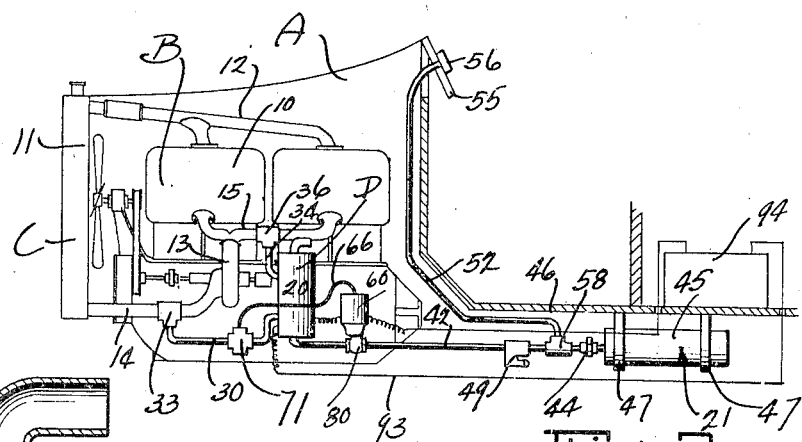

1,613,347

UNITED STATES PATENT OFFICE.

JOSEPH H. ERMATINGER, OF PESHTIGO, WISCONSIN.

THERMOSTATIC-CONTROLLED HEATING SYSTEM FOR WATER-COOLED ENGINES.

Application filed August 1, 1924. Serial No. 729,542.

This invention relates to improvements in means for maintaining the liquid in water cooled internal combustion engines at a sufficiently high temperature, during extremely cold weather, to prevent the same from dropping below a certain temperature and possibly freezing.

The primary object of this invention is the provision of an improved heating system which may be used in connection with the cooling system of internal combustion engines or the like, including novel means for automatically operating the heating system for raising the temperature of the water in the cooling system when the atmospheric temperature is low enough to chill the water in the cooling system below a predetermined temperature.

A further object of this invention is the provision of a heating arrangement for water cooling systems of engines, embodying novel means for automatically regulating fuel for the heating system, and novel means for igniting the same.

A further object of this invention is the provision of a thermostatic control arrangement for the automatic regulation of fuel and the igniting thereof.

Other objects and advantages of this invention will be apparent during the course of the following detailed description.

In the accompanying drawing, forming a part of this specification, and wherein similar reference characters designate corresponding parts throughout the several views.

Figure 1 is a fragmentary view, partly in cross section, of an automotive vehicle, showing the power plant thereof, and the relation of the details of the improved heating system thereto.

Figure 2 is a fragmentary cross sectional view taken through the improved thermostatic control means, which is associated with the heating system in order to control flow of fuel to the heating system and the ignition thereof, in an automatic manner.

Figure 3 is a fragmentary cross sectional view taken through the heater unit of this invention.

Figure 4 is a fragmentary cross sectional view taken through a portion of a thermostat, showing the manner in which the same is connected in the regular circulating system of a water cooled engine, whereby the thermostat may be controlled by the temperature of the water in the water cooled internal combustion engine system.

Figur 5 is a fragmentary view, partly in cross section, showing a resistance igniting unit employed in this invention.

In the drawing, wherein for the purpose of illustration is shown only a preferred embodiment of the invention the letter A may generally designate an automotive vehicle, which may include an internal combustion engine B having the cooling system C of any preferred construction associated therewith, and which is preferably of the pump operated water cooling type. The improved heating system D has associated therewith the thermostatic control arrangement E in order to regulate the efficiency of the heating system D to accomplish raising of the temperature of the water in the cooling system of the engine B when this water has dropped beyond a predetermined temperature.

Referring to the internal combustion engine B, the same may be of any approved type, including the water jackets 10; radiator 11; conduit means 12 leading from the top of the water jackets 10 to the top of the radiator 11; a circulating pump 13; conduit means 14 connecting the lower portion of the cooling radiator 11 with the pump 13; and conduit means 15 connecting the pump with the water jackets 10 at the lower portions of the latter. The circulation of water in the cooling system will, of course, be understood; the pump 13 passing the water through the conduit 15 into the water jackets and then upwardly to the line 12 into the radiator 11, and as the water is cooled it drops into the line 14 and is drawn by the pump and forced through the water jackets. The thermo-siphonic system is practically the same as above described, with the exception that no pump 13 is provided, and this invention may be used in connection with such a system.

The heating system D preferably embodies a heating unit 20; and fuel supply means 21. The unit 20 preferably includes a substantially cylindrical shaped casing 22, within which lower and upper headers 25 and 26 respectively are provided, which may be cylindrical in formation. Between these headers 25 and 26 three spirally wound coils 27, 28 and 29 are preferably provided, connected at their lower ends to the lower header 25 and at their upper ends to the upper header 26. A pipe line 30 preferably connects with the lower portion of the lower header 25, and extends laterally through the housing 22 and connects in the pipe 14 between the pump 13 and the radiator 11, for the passage of water from this point in the cooling system through the line 30 into the header 25 and thence upward through the coils 27, 28 and 29 into the upper header 26. The upper header 26 has a laterally extending conduit or pipe 34 connected therein, which leads laterally through the housing 22, and connects in the line 15 of the cooling system C, between the pump 13 and the engine jacket 10; this line 34 having connection in the pipe or conduit 15 by means of a T-coupling 36.

A novel type of burner 38 is preferably placed in the lower portion of the housing 22, in the compartment 39 of said housing, and immediately below the lower header 25; this burner 38 including a perforate top surface 40 having a lateral recess or groove 41 therein adapted to receive an ignition unit. This burner 38 has a conduit or fuel line 42 leading therefrom and rearwardly of the automotive vehicle A, and has detachable connection, as by a coupling 44, with the nozzle end of a cylindrical shaped fuel tank 45, which may be supported below the floor 46 of the automotive vehicle, as by means of detachable clamping straps 47. The fuel tank 45 preferably contains manufactured gas under pressure, and a pressure regulator 49 is preferably disposed some place in the fuel line or conduit 42 between the fuel tank 45 and the burner 38, for the purpose of reducing the pressure as it is fed to the burner 38. Between the pressure regulator 49 and the fuel tank 45, a conduit 52 is connected by a T-coupling 58, in the line 42, and this conduit 52 extends upwardly to the dash 55 of the vehicle, and has connection with a pressure gage 56 located on said dash, by means of which the operator may determine the pressure of the gas in the fuel tank 45, to determine whether the same should be renewed.

Referring to the improvd thermostatic control arrangement E for regulating the flow of fuel through the line 42 to the burner 38, and for regulating the ignition of this fuel at the burner 38, the same includes a substantially cylindrical shaped housing 60, provided with an expansible thermostat 61 therein, which comprises the bellows shaped expansible casing 62 with the expansible liquid 63 hermetically sealed therein. The top wall 64 of the expansible casing 62 is fixed with the top wall 65 of the casing 60, and a flexible conduit 66 communicates with the compartment in the bellows 62, and has a portion of the expansible liquid 63 therein. The flexible tube 66 extends outwardly from the top wall 65 of the housing 60, and at its outer end is detachably connected by a coupling 68 with a thermostat control bulb 69. The bulb 69 is preferably connected by means of a plug 70 within a + shaped coupling 71. The coupling 71 is adapted to be connected in the line 30 leading between the heater unit and the water cooling system line 14, as is illustrated in Figure 1 of the drawings, so that the water flowing through the line 30 from the water cooling system will contact the bulb 69, which extends across the passageway 73 through which the water flows in the casing 71, and regulates the temperature of the expanding fluid 63 of the thermostat.

For controlling the flow of fuel through the line 42 to the burner 38, it is preferred to provide a valve arrangement 80, which includes the casing 81 having a valve seat 82 therein, upon which a valve head 83 is adapted to seat in order to control the passageway through the line 42. Rigid with this valve head 83 is a vertically disposed valve rod 84, which extends upwardly through a stuffing box 85 into the casing 60 of the thermostatic control unit E, and this rod 84 at its upper end 87 is fixed with the lower wall 88 of the thermostat casing 62. The rod 84 thus has a sliding liquid and fuel leak proof connection with the valve casing 81 through the stuffing box 85, and this valve rod 84 preferably extends upwardly through a partition 89 formed rigid within the casing 60. A spiral expansion spring 90ª is preferably disposed between the partition 89 and the lower wall of the thermostat casing 62, and which spring normally acts to unseat the valve head 83 when the expansible liquid in the thermostat casing 62 permits of such unseating of the valve.

As to the automatic igniting of the fuel when flowing through the burner 38, it is preferred to provide a resistance element 90, preferably a piece of carbon, in resting relation within the groove 41 of the burner 38; this resistance unit 90 preferably being supported in insulated bearings 91 in order to insulate the same from the burner 38. Wires lead from the opposite ends of this resistance unit 90, comprising a circuit 93 in which the storage battery 94 or an analogous current source is located. An automatically controlled switch is also located in this circuit 93, and carried by the casing 60, including the terminal 95 carried in an insulation bushing 96 by the casing 60, so that the inner tapered end of this terminal 95 extends into the compartment of the casing 60 below the partition 89. The outer end of this terminal 95 has a wire 98 connected thereto, and which wire 98 is part of the circuit 93. In similar manner a terminal 100 is carried by the valve stem 84, below the terminal 95, and so that an end of the terminal 100 will engage the outer end of the terminal 95 when the valve 84 is unseated. Of course, a wire 102 is connected with this terminal 100, and which wire 102 is part of the circuit 93. In order to permit ready movement of the valve rod the wire 102 is coiled, as at 103, within the casing 60.

From the foregoing description of this invention the operation of the improved thermostatic control heating system for water cooled engines will be apparent. If the engine B is idle, the water in the cooling system C, during cold weather, will lower in temperature, and when a certain low temperature has been reached the effect of the temperature on the bulb 69 will cause a contraction of the liquid 63 in the thermostat casing 62. This will tend to raise the thermostat casing 62, and assisted by the spring 90 the valve rod 84 will move upwardly and unseat the valve 83. This unseating of the valve 83 will permit the fuel to flow through the line 42 to the burner 38. As the valve 83 is unseated the terminal 100 will engage the stationary terminal 95 and complete the circuit through the ignition unit 90, causing the same to glow in incandescence, and cause the lighting of the fuel emanating from the burner 38. It is to be particularly noted that the improved conduit and coil arrangement of the heating system provides a by pass around the circulating pump 13, so that the water flows from the circulating conduit 14 through the line 30 past the bulb 69 into the lower header 25, and as the flame from the burner 38 heats the water in the coil 27, 28 and 29, the heated water will arise to the header 26, and pass through the line 34 into the conduit 15, and thence into the water jacket 10. Due to thermo-siphonic action the heated water will circulate through the cooling system, by passing around the circulating pump 13, and the improved thermostatic control heating system will maintain the water in the cooling system at a predetermined warm temperature to prevent the freezing thereof.

From the foregoing description of this invention it is apparent that an absolute preventative of freezing of the cooling medium in engine cooling systems has been provided, which does away with all the ineffective expedients for maintaining water in cooling systems warm, during cold weather, such as covers, alcohol, and other preventatives mixed with the cooling fluid. The automatic thermostatic control arrangement prevents chill of the cooling liquid, and consequently saves gas and electric current in that starting of the vehicle is rendered very easy.

Various changes in the shape, size, and arrangement of parts may be made to the form of the invention herein shown and described, without departing from the spirit of this invention or the scope of the claims

I claim:
1. In a heating arrangement for maintaining the cooling medium of water cooling systems above a predetermined low temperature the combination of a heating unit connected in the water circulating system for flow of the cooling medium therethrough, a burner, a gas drum, a conduit connecting the burner with the gas drum, a valve in said conduit, an expansible thermostat connected with the valve, said expansible thermostat having connection with the cooling medium whereby to be contracted when the water in the circulating system is dropped below a predetermined temperature in order to open the valve in said fuel line to permit flow of fuel to the burner, an electrical resistance unit associated with said burner, an electric circuit for the resistance unit, and a switch structure for the electric circuit including a stationary contact and a contact movable with said expansible thermostat adapted to engage the stationary contact to close said circuit when the fuel valve opens.

2. In a heating system for water cooled engines the combination with a water cooling system of an engine, a heating unit adapted to receive the circulating water from the cooling system, burner means associated with the heating unit including a fuel supply pipe, a valve for regulating flow of fuel in the pipe to said burner including a stem movable with the valve, a thermostat having operating connection with the water cooling system of the engine and connected with the stem of the valve for operating the latter incident to temperature variation of the water in the water cooling system, normally inoperative ignition means associated with the burner means including a circuit having a unit therein adjacent the burner for supplying ignition to the fuel at the burner, said circuit including a normally open switch having a stationary contact and a contact movably carried by the stem of said valve adapted to engage the stationary contact to close the circuit incident to operation of said thermostat.

3. In a device of the class described the combination of a burner, means for supplying fuel to the burner including a pipe having a valve operating therein, a stem connected with said valve for movement therewith, an electric ignition means for igniting said burner including a circuit having an ignition unit therein adjacent the burner, said circuit including a switch arm carried by the stem for movement with the stem and valve to open and close the circuit, and thermostatic means connected with the stem for moving the stem incident to temperature variation.

JOSEPH H. ERMATINGER.